United States Patent [19]

Elmenhorst

[11] Patent Number: 4,964,351
[45] Date of Patent: Oct. 23, 1990

[54] DRY SOIL SPREADER FOR DISK FURROW OPENER

[76] Inventor: Joe H. Elmenhorst, Rte. 1 Box 159, Moran, Kans. 66755

[21] Appl. No.: 415,501

[22] Filed: Oct. 2, 1989

[51] Int. Cl.$^5$ .......................... A01C 5/06; A01B 35/28
[52] U.S. Cl. .................................... 111/140; 111/163; 172/763
[58] Field of Search ................ 172/26, 744, 763, 583; 111/134, 135, 136, 137, 71, 73, 79, 80, 81, 83, 84, 139–144, 147, 163–169, 926

[56] References Cited

U.S. PATENT DOCUMENTS

| | | | |
|---|---|---|---|
| 4,116,140 | 9/1978 | Anderson et al. | 111/139 X |
| 4,295,532 | 10/1981 | Williams et al. | 172/763 X |
| 4,304,304 | 12/1981 | Herchberger | 111/142 |
| 4,377,979 | 3/1983 | Peterson et al. | 111/140 X |
| 4,425,973 | 1/1984 | Williams et al. | 172/744 X |
| 4,483,401 | 11/1984 | Robertson | 172/744 X |
| 4,550,122 | 10/1985 | David | 111/140 X |
| 4,596,200 | 6/1986 | Gafford et al. | 111/140 X |
| 4,646,663 | 3/1987 | Nikkel et al. | 111/73 |

FOREIGN PATENT DOCUMENTS 63033  11/1912  Switzerland .......... 111/84

OTHER PUBLICATIONS

"Trash Movers", For Row Crop Planters, Farm Show Publishing Inc., vol. 13, No. 6, Nov.–Dec., 1989.

*Primary Examiner*—Danton D. DeMille
*Attorney, Agent, or Firm*—Robert K. Rhea

[57] ABSTRACT

In an agricultural drill having a frame plurality of pairs of furrow opening disk equipped supporting arms and pressure wheels are connected in trailing relation with the frame. A dry soil parting share is vertically adjustably connected with the respective pair of disk furrow supporting arms forwardly of the furrow opening disks and in the direction of disk travel so that as the drill is moved forwardly the share removes dry soil from the travel path of the furrow opening disks.

1 Claim, 1 Drawing Sheet

DRY SOIL SPREADER FOR DISK FURROW OPENER

BACKGROUND OF THE INVENTION

1. Field of the invention.

This invention relates to a drill having disk furrow openers mounted forwardly of a furrow closing seed compacting press wheel and more particularly to a device mounted forwardly of the disk furrow openers for parting dry soil or trash forwardly of the disk furrow openers.

Grain drills utilize a pair of disk furrow openers whose individual disks are set at an acute angle to the line of travel for opening a furrow of a selected depth which is then closed by a trailing pressure wheel compacting the soil falling back into the furrow on seed planted in the furrow between the disk furrow openers. Such a drill works satisfactory under normal or optimum conditions. However, in dry land farming and at the time of optimum seed planting, the soil many times lacks sufficient moisture to germinate seed when planted at the desired depth. The soil being dry at that depth and hence a lack of moisture, the seed fails to germinate resulting in a poor stand and considerable harvest loss.

If, in such dry soil conditions, the furrow openers and pressure wheel are set to a deeper soil depth to place the seed in a moist area the resulting depth of a furrow has a comparable result, a poor stand and a loss of harvest, as a result of the seed being planted at such a depth that it does not succeed in penetrating the soil after germination.

2. Description of prior art

I do not know of any prior patent disclosing a device such as mine which removes dry soil forwardly of the path of travel of the disk furrow opener of a drill. Prior patents generally relate to the feature of runners or compactors adjacent the soil opening disk which insure that the soil is moved back into furrow covering position without being inverted and dispersing herbicides which may have been sprayed on the soil between harvest and planting time, to prevent damage to or retarding the germination of seeds planted in such furrows.

SUMMARY OF THE INVENTION

An outer sleeve is generally vertically disposed between furrow disks and pressure wheel supporting arms connected with a drill frame. The sleeve is disposed forwardly of the furrow opening disks and clamped to the arms. An inner telescoping sleeve is vertically slidably supported by the outer sleeve for vertical adjustment and a preselected depth of earth parting action of a plow share or soil parting disks journaled on horizontal axles at the depending end of the inner sleeve.

The principal object of this invention is to provide a share device for moving loose soil in a lateral direction forwardly of the path of travel of a pair of disk furrow openers on a grain drill.

DESCRIPTION OF THE PREFERRED EMBODIMENTS

Figure 1:
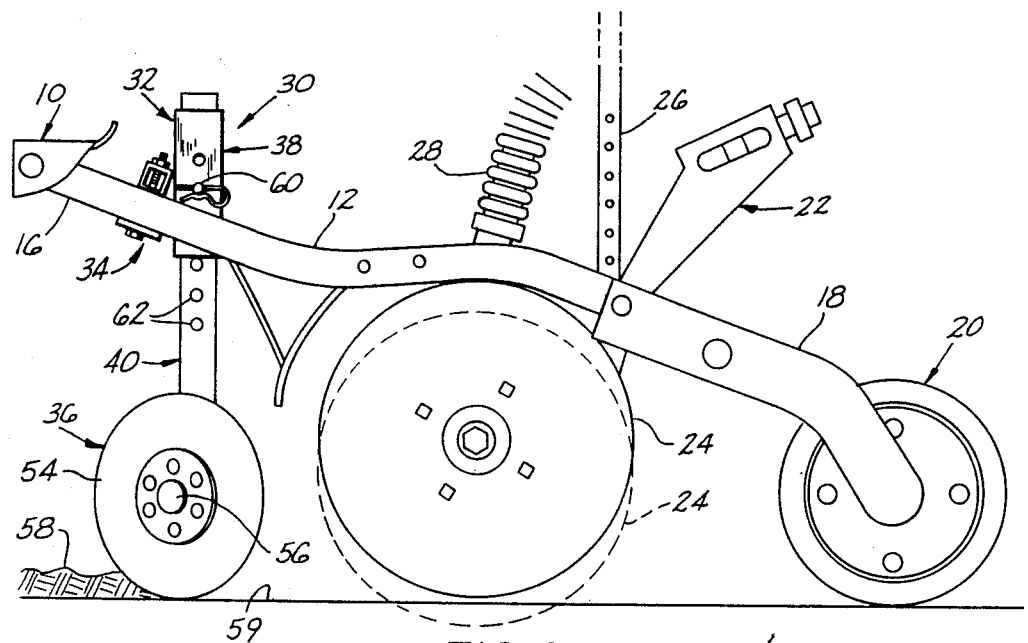
FIG. 1 is a fragmentary side elevational view of one grain drill disk furrow opener and pressure wheel supported by drill frame connected arms having the device connected therewith.
Figure 2:
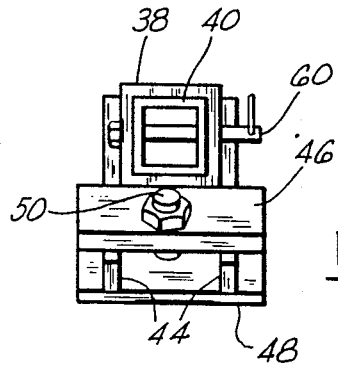
FIG. 2 is a top view of the device, per se.
Figure 3:
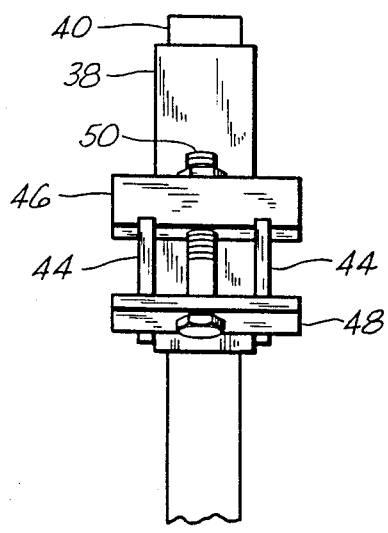
FIG. 3 is a fragmentary front elevation view of FIG. 2.
Figure 4:
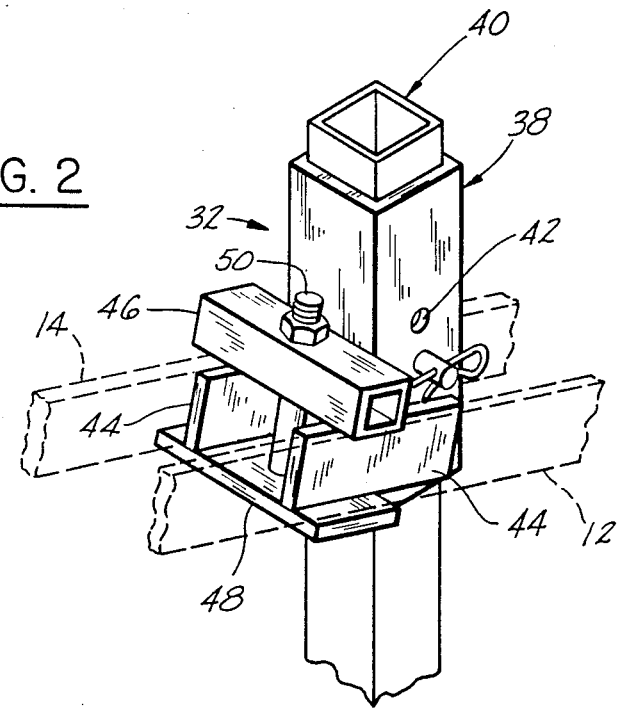
FIG. 4 is a perspective view of FIG. 2 illustrating by dotted lines the relative position of the disk furrow opener supporting arms.

Like characters of reference designate like parts in those figures of the drawings in which they occur.

In the drawings:

Referring more particularly to FIG. 1, the reference numeral 10 indicates a fragment of a grain drill having a pair of elongated arms 12 and 14 connected in parallel spaced apart relation at their forward end portions 16 with the drill frame 10 and extending rearwardly and downwardly therefrom and terminating in a pair of pressure wheel support arms 18, only one being shown, journaling a pressure wheel 20 at their rearward end limit. Intermediate their ends the arms 12 and 14 support bracket means 22 therebetween in depending relation which pivotally journals a pair of disk furrow openers 24, only one being shown.

A strut 26 connected at its depending end between the arms 12 and 14 supports the pressure wheel 20 at a selected elevation relative to the surface of the earth and imparts a downward force of predetermined magnitude on the pressure wheel to compact soil opened by the disks 24.

A seed conducting tube means 28 extending downward from the drill body, not shown, to a position above the furrow opening disks deposits seeds, not shown, in the furrow opened thereby. The furrow opening disks are each disposed at an acute angle with respect to the direction of travel so that their forward depending edge portions are disposed in close relation and open a furrow, at their downmost depending rearward portions, of a selected depth by pushing soil in a lateral direction for the deposit of seed. The soil then falls back into the furrow, after the passage of the furrow opening disks and is compacted by the pressure wheel 20.

The above description is conventional with seed planting drills presently in use and is set forth to show the combination with which the present invention, indicated at 30, is to be used.

The soil parting means 30 comprises telescoping sleeve means 32, a clamp means 34, and soil parting share means 36. In the example shown, the sleeve means 32 comprises a square, in transverse section, outer sleeve 38 formed from a length of tubing having a relatively short length when compared with the length of the inner sleeve 40. The sleeve is transversely line drilled, as at 42, for the purposes presently explained. Adjacent its depending end, a pair of links 44 are respectively rigidly connected with opposing sides of the sleeve 38 in a forward and upward inclined direction with respect to the vertical axis of the sleeve 38 and parallel with the longitudinal axis of the arms 12 and 14 at their forward end portions for the purpose of contiguously contacting, by their outer opposing surfaces, the inner surface of the respective arm 12 and 14.

The links 44 project forwardly toward the drill frame from the forward vertical plane of the sleeve 38 a distance sufficient to support the clamp means 34.

The clamp means is formed by a transverse tube 46 having a length at least as great as the combined distance between the drill arms 12 and 14 and overlie the latter in combination with the links 44. A transverse link 48 extends transversely of the links 44 lower surface and underlies the lower surface of the arms 12 and 14 and is substantially equal in length with the length of the tube 46.

Bolt and nut means 50 extend through suitable aligned apertures formed medially the length of the transverse link 48 and the short tube 46 for the purpose of fictionally gripping the upper and lower surfaces, respectively, of the links 44 and the drill arms 12 and 14 therebetween which maintains the sleeve means 32 generally vertically disposed and rigidly connected between the arms 12 and 14 at a selected distance forwardly of the drill furrow opening disks 24.

The inner telescoping, standard forming sleeve 40 is vertically slidably received by the bore of the sleeve 38 and journals at its depending end a pair of soil spreading disk means 36. In the example shown, the soil spreading disk means 36 comprises a pair of circular forward disks 54, only one being shown, which are journaled on horizontal axes 56, only one similarly being shown. The disks 54 are each disposed at an acute angle with respect to the direction of travel so that they move soil indicated at 58 in a lateral direction on both sides of the travel path to a preferred depth indicated by the line 59. The soil 58 being assumed to be so dry or so lacking in moisture that it will not germinate seed.

The vertical position of the soil parting disks 54 with respect to the arms 12 and 14, furrow disks 24 and the pressure wheel 20 is adjusted and maintained by a pin and clip 60 inserted through one of the apertures 42 of the outer sleeve 38 and a cooperating transverse aperture 62 in the inner sleeve 40.

Obviously, the soil parting means 30 may be a plow share in the form of a double-mouldboard commonly called a "lister", not shown, which throws soil in opposing directions.

Operation

In operation the soil parting apparatus 30 is installed on each pair of drill arms 12 and 14 as described hereinabove. The sleeve 40 is vertically telescoped relative to the sleeve 38 to position the soil parting disks 54 at a desired soil depth with respect to the surface of the soil and disks 24 are lowered relative to the arms 12 and 14 to the preferred depth of the furrow as shown by dotted lines (FIG. 1) so that the dry soil 58 is moved out of the path or direction of travel of the furrow opening disks 24.

Obviously the invention is susceptible to changes or alterations without defeating its practicability. Therefore, I do not wish to be confined to the preferred embodiment shown in the drawings and described herein.

I claim:

1. An agricultural drill having a frame and a pair of trailing arms pivotally connected with the frame in trailing relation for vertical pivoting movement and supporting furrow opening seed planting disks forwardly of a press wheel and maintained at a selected elevation with respect to the surface of the earth by a depth control strut, the improvement comprising:

soil parting means disposed forwardly of said furrow opening disks;

telescoping sleeve means including an outer sleeve and an inner sleeve connecting said soil parting means to said arms for maintaining said soil parting means at a selected elevation relative to said furrow opening disks, said soil parting means including a pair of opposed forward disks journalled on horizontal axles fixed to the depending end portion of said sleeve means for respectively moving dry soil laterally with respect to the center line of travel of said furrow opening disks;

pin means securing said sleeves in a selected telescoped position; and, means including a clamp for connecting said sleeve means with said arms, said clamp means including a pair of links secured to opposing sides of one said sleeve for contiguous contact with an intermediate portion of the inwardly disposed surfaces of said arms, a pair of clamp members extending transversely of one end portion of said pair of links and an intermediate portion of said arms in respective overlying and underlying relation, and, bolt means joining said clamp members in arm gripping relation.

* * * * *